Figure 1:
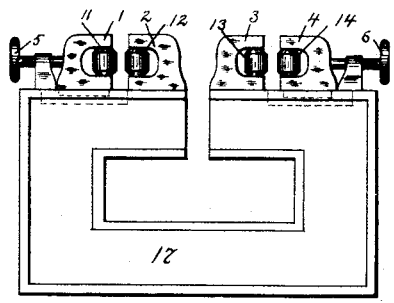

(No Model.)

H. LEMP & L. M. SCHMIDT.
METHOD OF AND APPARATUS FOR ELECTRIC WELDING.

No. 446,974. Patented Feb. 24, 1891.

WITNESSES
H. B. Emery
W. S. Moody

INVENTORS
Hermann Lemp
Louis M. Schmidt

UNITED STATES PATENT OFFICE.

HERMANN LEMP AND LOUIS M. SCHMIDT, OF LYNN, MASSACHUSETTS, ASSIGNORS TO THE THOMSON ELECTRIC WELDING COMPANY, OF MAINE.

METHOD OF AND APPARATUS FOR ELECTRIC WELDING.

SPECIFICATION forming part of Letters Patent No. 446,974, dated February 24, 1891.

Application filed July 23, 1890. Serial No. 359,618. (No model.)

*To all whom it may concern:*

Be it known that we, HERMANN LEMP and LOUIS M. SCHMIDT, citizens of the United States, and residents of Lynn, in the county of Essex and State of Massachusetts, have invented a certain new and useful Method of Electric Welding, of which the following is a specification.

Our invention relates to a process of forming longitudinal metal joints, in which the heating necessary to obtain the joint is produced by means of a current of electricity, and the welding or joining action is obtained by force expended in a direction practically at right angles to the length of the pipes or pieces to be joined.

Our invention is especially applicable to the welding, brazing, or otherwise joining of separate strips, bars, rods, &c., of metal side by side; and it consists, essentially, in feeding the work longitudinally through suitable devices in proper manner to cause the parts or pieces to be forced together and at the same time passing the heating electric current longitudinally through the parts or portions of the work approaching the devices by which the pressure or other force is applied. The means for applying the force that shall effect the welding or soldering at the joint may be pressure-rolls, hammers, or other devices for applying suitable mechanical force. We prefer, however, generally to employ pressure-rolls or other pressure devices.

In the operation constituting our invention the work in which the longitudinal joint is to be formed is given a continuous movement and the heat and welding action applied continually and simultaneously as the work moves through the machine.

In carrying out our invention we may use the pressure devices themselves as the means for making the electrical connection with the work at one point, a connection being made at another point by rollers or other devices, as desired, or the pressure-rollers or similar devices may be out of the circuit and a current fed into one piece at a point removed from the pressure device through such piece to the point of contact with the other or others and then through the latter and out by another device, making connection alone with such latter piece or pieces. While we prefer to employ contact-rollers for passing the current into and out of the work we do not confine ourselves to such device; but may employ any means for making electrical connection with the work. The current may be passed through the parts or portions of the work, so that it shall flow through such parts or portions in series or in multiple or parallel circuit. Both ways are herein described and illustrated.

In another suggested process for electrically joining metal strips of all kinds the strips are in continuous movement and the current is applied to the stock by means of rollers; but in the said process the current is made to flow through the stock in a direction at right angles to its length and the direction of movement or transversely from one side to the other of the pressure devices, while in this process the current travels longitudinally. In such former process the heating takes place only while the metal passes between the rollers that effect the joining, while in the process forming our invention the heating is extended over some length of metal and it becomes hot before it comes into contact with the welding-rolls. It is evident that in the other process referred to, in order to attain a welding temperature, a current of immense volume must be used and the blanks must move very slowly. Also, when using thin strips, the cooling effect of the contact-rollers is almost as great as the heating of the current, and it is impossible to obtain a good welding temperature. In our process the rapidity of operation is much greater, and the rollers have comparatively small cooling effect, as will be seen farther on. The process may be applied to securing ribs to metal plates, to brazing or soldering irregular shapes to plain backgrounds, to welding, brazing and soldering pipes and tubes longitudinally, to uniting strips of dissimilar metal, and to other work.

In the accompanying drawings, we have illustrated apparatus which may be employed for joining metal strips, bars, or rods by our invention.

Figure 2:
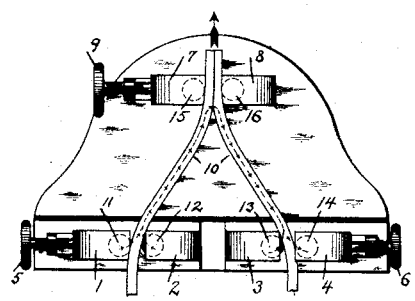
Figure 3:
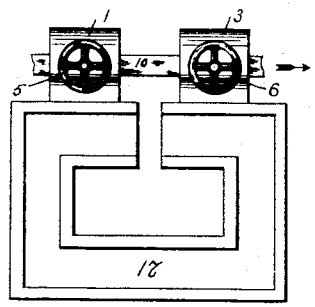
Figure 4:
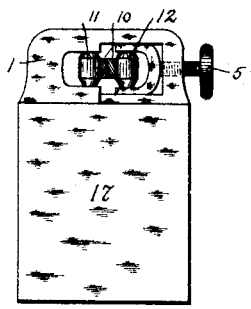
Figure 5:
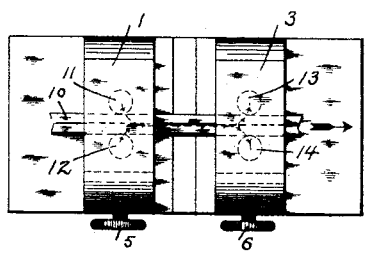

Figure 1 is a side elevation of one form of apparatus, and Fig. 2 a plan view thereof. Fig. 3 is a side elevation of another arrangement of mechanism suitable for carrying out our invention. Fig. 4 is an end elevation of the same, and Fig. 5 is a plan view.

The source of electric current may be any desired apparatus suitable for developing and furnishing a current of the proper strength or volume. In the present case we have shown the source of current as consisting of the secondary of an alternating-current transformer of the general form and character described in the patent of Hermann Lemp, No. 428,618, dated May 27, 1890. The secondary is indicated at 17, and the devices which deliver the current to the moving metal pieces are mounted on the terminals of such secondary bar.

In the arrangement illustrated in Figs. 1 and 2, the current is passed in series through the two strips or pieces of metal 10, which are to be joined together.

11, 12, 13, and 14 are contact-rollers. The roller 12 is mounted in a bracket or support 2, preferably integral with the copper secondary 17, and roller 11 is mounted upon a similar support 1, that by means of a screw 5 may be adjusted toward the opposite roll 12. The support 1 is in contact with the same terminal of the secondary as roller 12, and slides thereon in suitable bearings. Rollers 13 14 are similarly mounted on the other terminal of the secondary in supports 3 4, and adjusting-screw 6 serves to move the roller 14 toward the opposite roller 13. These parts are preferably of the same metal as the secondary—that is to say, copper. By means of the screws 5 and 6 adjusting the rollers 11 and 14, the contact may be varied and different sizes of stock provided for. In this arrangement the contact-rolls 11 and 12 represent one terminal of the circuits and the contacts 13 14 the other terminal of the circuit of the source of currents.

The devices for pressing or forcing the two strips 10 together are illustrated in Fig. 2, and are preferably mounted upon a table insulated from the transformer. These pressure devices consist in the present instance simply of rollers 15 16, which are of steel or other durable material, and are mounted in proper bearings 7 and 8 of the same design as 1 and 2. The screw 9 acts upon the movable casting or support 7 for the purpose of adjusting the rollers 15 16 with relation to one another. The work may be drawn through the rollers 15 16 in the direction of the arrow by any suitable means, or rotation may be imparted to the rollers 15 16 themselves, as well understood in the art of metal working. The small arrows indicate the direction in which the current will flow through the pieces 10.

In using the apparatus the two strips 10 to be joined are placed in position between the contact-rolls forming the terminals of the source of current, and their ends are brought into contact with one another between the rolls 15 16. The pressure-screw 9 is then moved to clamp them firmly together between the rolls, after which, on turning on the current, the pieces will become heated between the point of application of the pressure devices and the terminals of the source of current. The pieces now being moved continually through the pressure devices in the direction of the arrow will be united thereby, and fresh portions of the pieces to be united will be continually heated in the part included for the time being in the electric circuit for the transformer, which feeds the current longitudinally through the strips or pieces 10.

It is obvious that the same process might be applied to the joining of any number of strips together at once, the strips or pieces being placed upon one another and fed between the pressure devices or other means for uniting them by laterally-applied force.

In the arrangement shown the current passes in series through the parts of the work, but it might be made to pass through the strips, pieces, or portions of the work to be joined in parallel circuit, as illustrated in Figs. 3, 4, and 5, where we have shown contact-making devices of the same general character mounted upon the terminals of the secondary 17, but differently arranged with relation to one another, so that the work will be fed from one pair of rolls, as 11 and 12, to and through the other pair 13 and 14. The rollers are a little differently mounted in this case, one of them, as 12, being carried in a slide which moves in a casting that is continuous with the part 1, carrying the opposite roller.

The blanks or strips 10 are fed from one pair of rollers 11 12, forming one terminal of the secondary, to and through the other pair 13 14, in the direction indicated by the arrow, Fig. 5. In this operation it is obvious that the current will flow through the two strips or parts of the work in parallel circuit; but, as before, the parts or pieces are heated by current passing longitudinally through the portions of work which are approaching the pressure or other devices for forcing them together. When the apparatus shown in Figs. 3, 4, and 5 is employed, the contact-rolls 13 14 may serve also as the pressure devices, and, in fact, should be preferably used as the means for forcing the parts of the work into union.

It is obviously not necessary to the carrying out of our invention that the two parts of the work when the current is passed longitudinally through the same in parallel should be fed from the same transformer or source of current, since obviously each portion might be fed with current from a separate source. The devices we have described for making electrical contact with the work are effective for the purpose, though the connection might be made by flat or rubbing surfaces and the contact portions or surfaces of the apparatus might be carbon instead of copper. It will be observed that in our process the heating commences some time before the application of the pressure or other force for uniting the parts and that the metal has time to reach a high temperature even though it be moved moderately fast.

What we claim as our invention is—

1. The herein-described method of forming longitudinal metal joints by a soldering, cementing, or welding operation, consisting in feeding the pieces to be joined through suitable pressure or other devices while properly arranged so as to be pressed together by said devices and passing a heating electric current through the material in a longitudinal direction before it reaches the pressure or other welding devices.

2. The herein-described improved method of soldering, cementing, or welding strips, bars, or rods of metal side by side, consisting in feeding the same through suitable pressure-rolls while lapped upon one another in proper manner to be pressed together by said rolls and at the same time passing a heating electric current through said strips, bars, or rods in a longitudinal direction between the point of pressure and another point or points removed therefrom in the direction from which the metal is being fed.

3. The herein-described improvement in uniting strips, bars, or rods of metal longitudinally, consisting in feeding them while lapped upon one another between suitable pressure-rolls or devices arranged to squeeze or force them together and at the same time passing a heating electric current longitudinally through such pieces at parts thereof between the point of pressure and points removed therefrom in the direction from which the material is being fed.

4. In an electric soldering or welding apparatus, the combination, substantially such as described, of two pairs of pressure-rolls 13 14 11 12, arranged in line with one another so that the material may be fed through them from one pair to the other, said pairs of rolls forming, respectively, opposite terminals or electrodes of a source of heating-current.

5. The combination, substantially such as described, with a transformer secondary adapted to deliver currents of large volume for heating purposes, of two pairs of rolls or pressure devices mounted on the terminals of said secondary in line with one another, so that strips, bars, or pieces of metal to be united may be fed through such pair of rolls from one to the other.

6. The combination, with a transformer secondary adapted to deliver current of large volume, of pressure-rolls mounted on one terminal of such secondary, and contact devices mounted on the other terminal in line with the first, so that the material may be fed longitudinally through the contact devices and between the pressure-rolls, as and for the purpose described.

Signed at Lynn, in the county of Essex and State of Massachusetts, this 19th day of July, A. D. 1890.

HERMANN LEMP.
LOUIS M. SCHMIDT.

Witnesses:
JOHN W. GIBBONEY,
DUGALD MCKILLOP.